United States Patent
Schnabl et al.

(10) Patent No.: US 9,047,616 B2
(45) Date of Patent: Jun. 2, 2015

(54) METHOD OF GENERATING A PRIORITIZED LISTING OF CUSTOMERS USING A PURCHASE BEHAVIOR PREDICTION SCORE

(71) Applicant: AUTOMOTIVEMASTERMIND, LLC, New York, NY (US)

(72) Inventors: Marco G Schnabl, New York, NY (US); Johannes Gnauck, New York, NY (US)

(73) Assignee: AUTOMOTIVEMASTERMIND, LLC

( * ) Notice: Subject to any disclaimer, the term of this patent is extended or adjusted under 35 U.S.C. 154(b) by 0 days.

(21) Appl. No.: 14/290,776

(22) Filed: May 29, 2014

(65) Prior Publication Data

US 2014/0358634 A1     Dec. 4, 2014

Related U.S. Application Data

(60) Provisional application No. 61/829,921, filed on May 31, 2013.

(51) Int. Cl.
     *G06Q 40/00*          (2012.01)
     *G06Q 30/02*          (2012.01)

(52) U.S. Cl.
     CPC .......... *G06Q 30/0202* (2013.01); *H05K 999/00* (2013.01)

(58) Field of Classification Search
     CPC ....... G06Q 10/00; G06Q 20/00; G06Q 30/00; G06Q 40/00
     USPC ...................................................... 705/3–44
     See application file for complete search history.

(56) References Cited

U.S. PATENT DOCUMENTS

| | | | |
|---|---|---|---|
| 6,456,982 B1 * | 9/2002 | Pilipovic | 705/36 R |
| 7,827,099 B1 | 11/2010 | Cotton | |
| 7,848,995 B2 * | 12/2010 | Dalal | 705/37 |
| 8,005,752 B1 | 8/2011 | Cotton | |
| 8,086,529 B2 | 12/2011 | Cotton | |

(Continued)

OTHER PUBLICATIONS

Krynski, William, PCT Notification of Transmittal of the International Search Report and the Written Opinion of the International Searching Authority, or the Declaration, Aug. 29, 2014, pp. 1-7.

*Primary Examiner* — Frantzy Poinvil
(74) *Attorney, Agent, or Firm* — Stetina Brunda Garred & Brucker

(57) ABSTRACT

There is provided a method of generating on a computer a prioritized listing of customers. The method includes establishing a data communications link to a database including financial payment information related to a financial transaction of an existing vehicle of each customer. The method includes retrieving an existing payment amount based upon the financial payment information. The method includes calculating a new payment amount. The method further includes deriving a payment difference score based upon a difference between the existing payment amount and the new payment amount. The method includes determining a behavior factor. The method includes deriving on a computer a behavior score based upon the behavior factor. The method includes determining a purchase behavior prediction score based upon the payment difference score and the behavior score. The method further includes ranking each customer based upon the determined purchase behavior prediction score. The method further includes generating a prioritized listing using the ranking of each customer.

23 Claims, 11 Drawing Sheets

(56) References Cited

U.S. PATENT DOCUMENTS

| | | |
|---|---|---|
| 8,095,461 B2 | 1/2012 | Cotton |
| 8,355,950 B2 | 1/2013 | Colson et al. |
| 8,396,791 B2 | 3/2013 | Cotton |
| 8,498,916 B2* | 7/2013 | Somech et al. .............. 705/36 R |
| 8,527,349 B2 | 9/2013 | Colson et al. |
| 8,660,943 B1* | 2/2014 | Chirehdast ...................... 705/38 |
| 2002/0194117 A1* | 12/2002 | Nabe et al. ...................... 705/38 |
| 2007/0067233 A1* | 3/2007 | Dalal ............................... 705/37 |
| 2010/0217616 A1 | 8/2010 | Colson et al. |
| 2012/0158479 A1* | 6/2012 | Raisch ....................... 705/14.19 |
| 2013/0138577 A1* | 5/2013 | Sisk ........................... 705/36 R |
| 2013/0185190 A1 | 7/2013 | Cotton |
| 2013/0211865 A1 | 8/2013 | Cotton |
| 2013/0218636 A1 | 8/2013 | Colson et al. |
| 2013/0232050 A1* | 9/2013 | Rodbell .......................... 705/37 |
| 2014/0172687 A1* | 6/2014 | Chirehdast ...................... 705/38 |

* cited by examiner

| LEASE | FINANCE | CASH | Q Search Deals... | | | | | | Joe User | | Logout |
|---|---|---|---|---|---|---|---|---|---|---|---|
| CUSTOMER/ CURRENT VEHICLE | | STATUS | BPS | PAYMENT | EQUITY | INCENTIVES | PRODUCT | MILES | WARRANTY | OWNER | REMAINING |
| ABCD Global Llc 2011 ML350W4 | | SOLD | 85 | 66 | 87 | 83 | 100 | 100 | 100 | 94 | 100 |
| *Jane M.* 2012 E350W4 | | PRESENTED | 85 | 77 | 87 | 88 | 80 | 100 | 100 | 62 | 100 |
| *Thomas E.* 2011 E350W4 | | PRESENTED | 85 | 89 | 87 | 88 | 80 | 100 | 0 | 88 | 100 |
| *Joseph C.* 2012 E350W4 | | NEGOTIATING | 85 | 89 | 87 | 88 | 80 | 100 | 0 | 85 | 100 |
| *Ralph E.* 2011 E350A | | NOT CONTACTED | 85 | 89 | 87 | 86 | 80 | 100 | 0 | 92 | 100 |
| *Bill F.* 2011 E350W4 | | PRESENTED | 85 | 90 | 87 | 88 | 80 | 100 | 0 | 90 | 100 |
| *Thomas M.* 2011 C300W4 | | PRESENTED | 85 | 91 | 87 | 91 | 80 | 100 | 0 | 87 | 100 |
| David L. 2012 E350W4 | | SOLD | 85 | 91 | 87 | 88 | 80 | 100 | 0 | 84 | 100 |
| *Sam C.* 2011 ML350W4 | | NOT CONTACTED | 84 | 79 | 87 | 83 | 100 | 0 | 100 | 92 | 100 |
| *Frank H.* 2011 E350W4 | | NEGOTIATING | 84 | 86 | 87 | 88 | 80 | 0 | 100 | 87 | 100 |

*Fig. 3*

| 75 | 57 | 87 | 88 | 80 | 100 | 0 | 87 | 100 |
|---|---|---|---|---|---|---|---|---|
| BEHAVIOR PREDICTION SCORE | PAYMENT | EQUITY | INCENTIVES | PRODUCT | MILES | WARRANTY | OWNERSHIP | REMAINING |

DEAL STATUS
*Negotiating* ▼

$3,000 in Incentives are being applied.
$1,500 in Discounts are being applied.

QUALIFIED INCENTIVES
☐ Incentive 1   $2,500
☐ Incentive 2   $2,500   INCENTIVES
☐ Incentive 3   $3,500
☐ Incentive 4   $3,500   DISCOUNT
☐ Incentive 5   $3,500
☐ Incentive 6   $3,500
☐ Incentive 7   $3,500
☑ Incentive 8   $3,000
☑ Incentive 9   $0

INCENTIVES & DISCOUNTS

| | Amount | Total % |
|---|---|---|
| Customer1 | $3,000 | 5.1% |
| Total Manufacturer Incentives | $3,000 | 5.1% |
| Discount | $1,500 | 2.5% |
| Total Incentives | $4,500 | 7.6% |

*Fig. 6*

| 75 | 57 | 87 | 88 | 80 | 100 | 0 | 87 | 100 |
|---|---|---|---|---|---|---|---|---|
| BEHAVIOR PREDICTION SCORE | PAYMENT | EQUITY | INCENTIVES | PRODUCT | MILES | WARRANTY | OWNERSHIP | REMAINING |

*50  52  54  56  58  60  62  64  66*

DEAL STATUS *Negotiating* ▸

JUMP TO SELECTION
Dimensions
Fuel
Weight/Capacity
Engine/Performance
Warranty

*2014 E350W4* is a Facelift.

The Fuel Cost Savings are *$1,800* over the new 36 month term. Monthly fuel Cost Savings equal *$50*.

FECYCLE

| | 2011 MERCEDES-BENZ E350W4 | 2014 MERCEDES-BENZ E350W4 |
|---|---|---|
| | DIMENSIONS | |
| WIDTH | 75.9 in. | 73 in. |
| HEIGHT | 57.7 in. | 57.9 in. |
| LENGTH | 191.7 in. | 192.1 in. |
| GROUND CLEARANCE | 4.1 in. | NA |
| FRONT TRACK | 62.2 in. | 63 in. |
| REAR TRACK | 63.0 in. | 63.7 in. |

*Fig. 7*

| 75 | 57 | 87 | 88 | 80 | 100 | 0 | 87 | 100 |
|---|---|---|---|---|---|---|---|---|
| BEHAVIOR PREDICTION SCORE | PAYMENT | EQUITY | INCENTIVES | PRODUCT | MILES | WARRANTY | OWNERSHIP | REMAINING |
| 50 | 52 | 54 | 56 | 58 | 60 | 62 | 64 | 66 |

DEAL STATUS *Negotiating*
EST. MILES *34,211*  READING DATE *4/2/2014*

Risk: Allowed lease mileage is exceeded by est. *1,200* miles.

Monthly payment increase of *$285* until maturity, due to additional mileage penalties.

Please confirm current mileage *(34,211)*.

| | TODAY | | PROJECTED LEASE END | |
|---|---|---|---|---|
| REMAINING MONTHS/MILEAGE | 0 Months / 0 | | TOTAL ALLOWED MILEAGE | 33,011 |
| CURRENT ESTIMATED MILEAGE | 34,211 | | PROJECTED LEASE END MILEAGE | 37,631 |
| CURRENT ESTIMATED OVER MILEAGE | 1,200 | | ESTIMATED OVER MILEAGE | 4,620 |
| CURRENT ESTIMATED PENALTY | $300 | | ESTIMATED LEASE END PENALTY | *$1,155* |

METHOD OF GENERATING A PRIORITIZED LISTING OF CUSTOMERS USING A PURCHASE BEHAVIOR PREDICTION SCORE

CROSS-REFERENCE TO RELATED APPLICATIONS

This non-provisional patent application claims priority to U.S. provisional patent application Ser. No. 61/829,921 filed on May 31, 2013 entitled "BEHAVIORAL BASED PREDICTIVE METHOD, SYSTEM AND COMPUTER PROGRAM FOR IDENTIFYING AND PRIORITIZING CUSTOMER PURCHASE BEHAVIOR", the entire contents of which are incorporated herein by reference.

STATEMENT RE: FEDERALLY SPONSORED RESEARCH/DEVELOPMENT

Not Applicable

BACKGROUND

1. Technical Field

The present disclosure generally relates to sales software tools and related methods, including a method of generating a prioritized listing of customers.

2. Related Art

Automobile dealers have traditionally relied on advertising, vehicle showrooms, or word of mouth to attract customers and ultimately consummate sales. With the realization that a business' best potential customers are repeat customers who are loyal to the brand and/or the dealer, the focus has shifted to identifying such customers who may be interested in buying/leasing a new vehicle. In addition, the focus has also shifted to potential customers who have purchased similar models/brands in the past and may be willing to try a different brand as well as potential customers who may be ready to upgrade.

Customer relationship management (CRM) software broadly refers to a system that automatically records all stages of a sales process. These systems often include a sales lead tracking and management system. Specific to the needs of the automotive sales industry, there are a number of CRM software products that seek to perform data mining tasks to generate sales leads. Existing software products have been utilized to determine or estimate the financial status of a customer's vehicle, which includes not only existing deal terms, such as payment amount and contract term, but also information such as mileage and information regarding trade-in value. Based on a set of random assumptions, these existing software products generate new offers for customers and alert an automobile dealer if a customer may possibly save money on their monthly payment by switching to a different vehicle. Examples of such prior art software products are described in U.S. Pat. No. 7,827,099 entitled SYSTEM AND METHOD FOR ASSESSING AND MANAGING FINANCIAL TRANSACTIONS (assigned to AutoAlert, Inc.) and U.S. Pat. No. 8,355,950 entitled GENERATING CUTOMER-SPECIFIC VEHICLE PROPOSALS FOR VEHICLE SERVICE CUSTOMERS (assigned to XHCD Management, LLC).

Broadly speaking, these existing software products are merely data presentation tools that review a variety of deal parameters, compare those to random values or averages, and assume that customers who are eligible to purchase or lease a new vehicle for the same or a lower monthly payment would do so. Understanding that the customer may be able to obtain a new vehicle for a lower monthly payment is useful information when targeting a particular customer. However, this information falls short of predicting customer purchasing behavior because is does not account for other factors may have in influencing the customer decision-making process. Other contemporary CMS systems may utilize data mining that is primarily directed to financing so as to determine pre-qualified sales leads. The foregoing characterizations relate to systems and practices that have existed within the automotive industry for many years—specifically, the use of automated software tools that employ relatively unsophisticated methods to mine data and generate sales leads.

In this digital age, there is a vast amount of data related to particular customers that is accessible via the Internet and other computer networks. Effective utilization of such data may be used to perform predictive analysis to understand customer purchase behavior for targeting customers and generating sales leads. Accordingly, there is a need in the art for an improved method and system for generating sales leads.

BRIEF SUMMARY

According to an aspect of the invention, there is provided a method of generating on a computer a prioritized listing of customers. Each customer has an existing vehicle. The method includes establishing on a computer a data communications link to a database. The database includes financial payment information related to a financial transaction of the existing vehicle of each customer. The method further includes retrieving on a computer an existing payment amount based upon the financial payment information related to the financial transaction of the existing vehicle for each customer. The method further includes calculating on a computer a new payment amount related to a proposed financial transaction of a new vehicle for each customer. The method further includes deriving on a computer a payment difference score based upon a difference between the existing payment amount and the new payment amount for each customer. The method further includes determining on a computer a behavior factor for each customer. The behavior factor is not based upon a payment difference between the existing payment amount and the new payment amount for each customer. The method further includes deriving on a computer a behavior score based upon the behavior factor for each customer. The method further includes determining on a computer a purchase behavior prediction score based upon the payment difference score and the behavior score for each customer. The method further includes ranking on a computer each customer based upon the determined purchase behavior prediction score. The method further includes generating on a computer a prioritized listing using the ranking of each customer.

The foregoing method may be used by automotive sales personnel as a tool to help them identify potential sales leads. This is done by providing a prioritized listing of various customers for use by sales personnel to use at their discretion. Advantageously, the foregoing method recognizes that in determining whether to purchase or lease a new vehicle, a customer's decision-making process is much more complex than a simple comparison of an existing payment amount and a new payment amount. The method considers a behavior factor that is not based upon a payment difference between the existing and new payment amounts. In this regard, the method facilitates the consideration a factor that is beyond mere differences in payment amounts and allowing for a more robust or intelligent sales tool.

According to various embodiments, the method may further include making the prioritized listing available via a computer. The behavior factor may be an equity value. The equity value may be related to a summation of payments made with regard to the financial transaction of the existing vehicle for each customer. The equity value may be related to a financial obligation pay-off amount with regard to the financial transaction of the existing vehicle for each customer. The equity value may further be related to a determined market value of the existing vehicle for each customer. The behavior factor may be a payments remaining value. The payments remaining value may be related to a summation of a number of payments remaining with regard to the financial transaction of the existing vehicle for each customer. The behavior factor may be a warranty related value. The warranty related value may be related to a warranty status with regard to the financial transaction of the existing vehicle for each customer. The behavior factor may be a lease mileage value. The lease mileage value is related to a status of a number of miles driven of the existing vehicle for each customer with regard to total allowable lease mileage. The behavior factor may be a product related value. The product value may be related to specific product enhancements of the new vehicle compared to the existing vehicle for each customer. The behavior factor may be an amount of time of ownership related value. The amount of time of ownership related value may be related to the amount of time owning the existing vehicle for each customer. The behavior factor may be an incentive related value. The incentive related value may be related to the total amount of current available financial incentives related to a proposed financial transaction of a new vehicle for each customer. The incentive related value may be related to customer employment data. The method may further include receiving on a computer customer employment data associated with at least one customer. The customer employment data is related to the employer of the customer. The behavior factor may be an interest rate related value. The interest rate related value may be related to an interest rate related to a proposed financial transaction of a new vehicle for each customer. The behavior factor may be a household demand value. The household demand value may be related to a number of vehicles associated with each customer. The household demand value may be based upon vehicle registration data. The method may further include receiving on a computer vehicle registration data associated with at least one customer. The determination on a computer of a behavior factor for each customer may include establishing on a computer a data communications link to a database. The database contains information regarding the behavior factor. The behavior factor may include more than one behavior factor. The method may further include deriving on a computer a behavior score based upon each behavior factor for each customer. The purchase behavior prediction score may be based upon the payment difference score and the behavior scores for each customer. The method may further include determining on a computer a buying behavior factor for each customer, and determining the purchase behavior prediction score using the buying behavior factor to adjust a relative weighting among the payment difference score and the behavior scores for each customer.

According to another aspect of the invention, there is provided an article of manufacture comprising a non-transitory program storage medium readable by a data processing apparatus. The medium tangibly embodies one or more programs of instructions executable by the data processing apparatus to perform a method of generating on a computer a prioritized listing of customers. Each customer has an existing vehicle. The method includes establishing on a computer a data communications link to a database. The database includes financial payment information related to a financial transaction of the existing vehicle of each customer. The method further includes retrieving on a computer an existing payment amount based upon the financial payment information related to the financial transaction of the existing vehicle for each customer. The method further includes calculating on a computer a new payment amount related to a proposed financial transaction of a new vehicle for each customer. The method further includes deriving on a computer a payment difference score based upon a difference between the existing payment amount and the new payment amount for each customer. The method further includes determining on a computer a behavior factor for each customer. The behavior factor is not based upon a payment difference between the existing payment amount and the new payment amount for each customer. The method further includes deriving on a computer a behavior score based upon the behavior factor for each customer. The method further includes determining on a computer a purchase behavior prediction score based upon the payment difference score and the behavior score for each customer. The method further includes ranking on a computer each customer based upon the determined purchase behavior prediction score. The method further includes generating on a computer a prioritized listing using the ranking of each customer.

The presently contemplated embodiments will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 3 is an exemplary display screen displaying a main customer listing dashboard;

FIG. 6 is an exemplary display screen of a behavior factor associated with incentives factor information for the sample customer;

FIG. 7 is an exemplary display screen of a behavior factor associated with product factor information for the sample customer;

FIG. 8 is an exemplary display screen of a behavior factor associated with miles factor information for the sample customer;

Common reference numerals are used throughout the drawings and the detailed description to indicate the same elements.

DETAILED DESCRIPTION

The detailed description set forth below in connection with the appended drawings is intended as a description of the presently preferred embodiments of the invention, and is not intended to represent the only form in which the present methods and devices may be developed or utilized. It is to be understood, however, that the same or equivalent functions may be accomplished by different embodiments that are also intended to be encompassed within the spirit and scope of the invention. It is further understood that the use of relational terms such as first, second, and the like are used solely to distinguish one from another entity without necessarily requiring or implying any actual such relationship or order between such entities.

Figure 1:
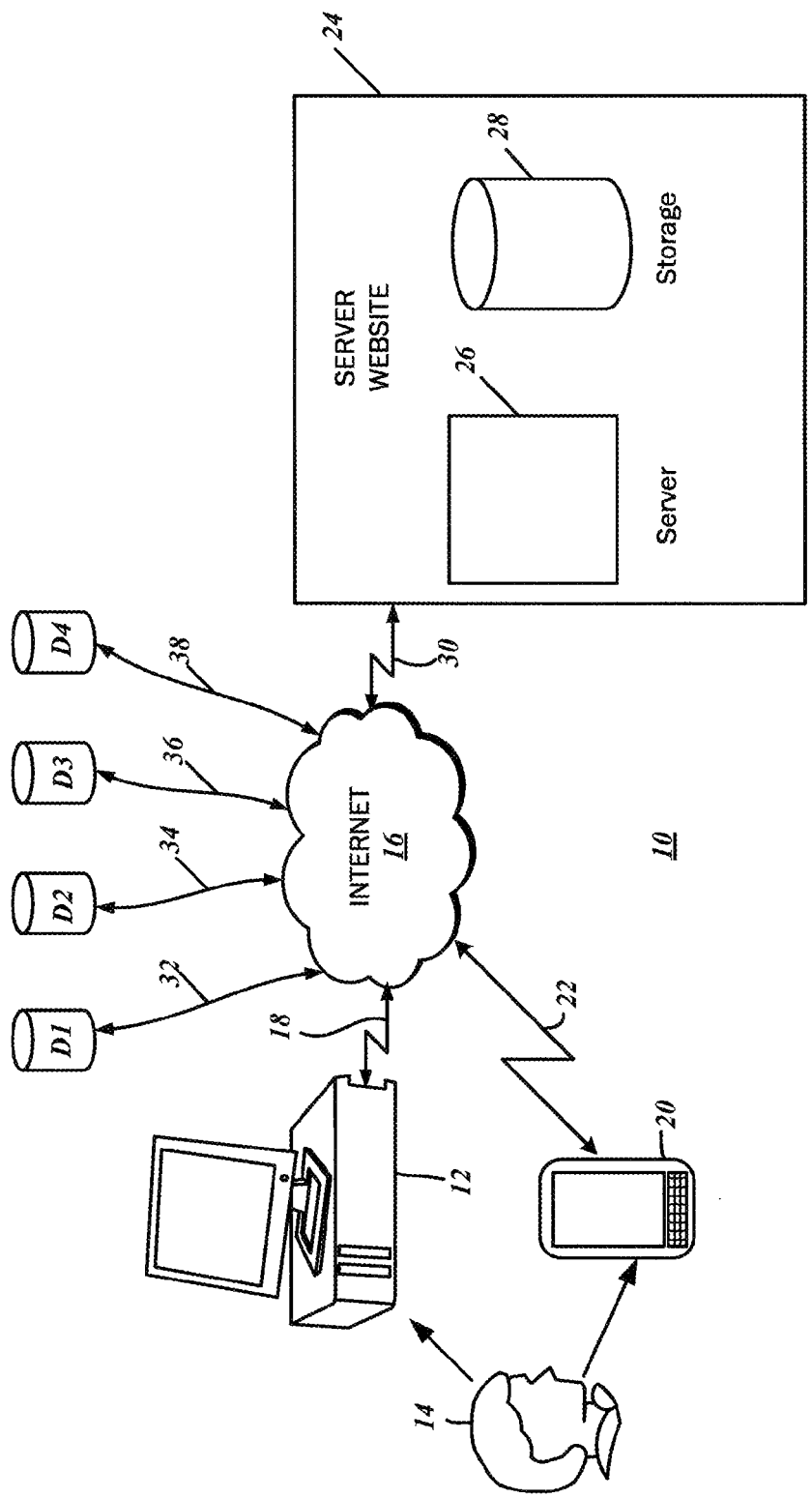
FIG. 1 is a block diagram showing an exemplary networked computing environment in which various embodiments of the present disclosure may be implemented.

FIG. 1 depicts one exemplary embodiment of a networked computing environment 10 where various embodiments of a system and method of generating a prioritized list of customers may be implemented. Although specific components thereof are described, those having ordinary skill in the art will recognize that any other suitable component may be substituted. One component is a client computer system 12 operated by a user 14. The client computer system 12 may be a conventional personal computer device including a central processing unit, memory, and various input and output devices such as keyboards, mice, and display units. The client computer system 12 is connectible to the global Internet 16 via a communications link 18.

Some embodiments can utilize a mobile device 20 that is likewise connectible to the Internet 16 via a wireless communications link 22. The invocation of the system and method of generating a prioritized listing of customers by the user 14 need not be restricted to be from a set physical location as may be the case with the client computer system 12. Untethered data communication modalities such as the mobile device 20 make this possible, and examples thereof include cellular phones, smart phones, and tablet computing devices. The mobile device 20 and the client computer system 12 are understood to have similar features, in particular, executable instructions of a web browser application that are loaded thereon. The web browser application communicates with various web servers also connected to the Internet 16 over the hypertext transfer protocol (HTTP), among other protocols known in the art. Where the user 14 is a sales person, such sales person may readily access the networked computing environment 10 from such locations as the sales floor, client location and the like, where immediacy of access to information is advantageous to the sales process.

The networked computing environment 10 includes a server, such as the server website 24 that is also connected to the Internet 16. The server website 24 includes at least one server 26 and storage 28 for retaining various data used by the server website 24.

Figure 2:
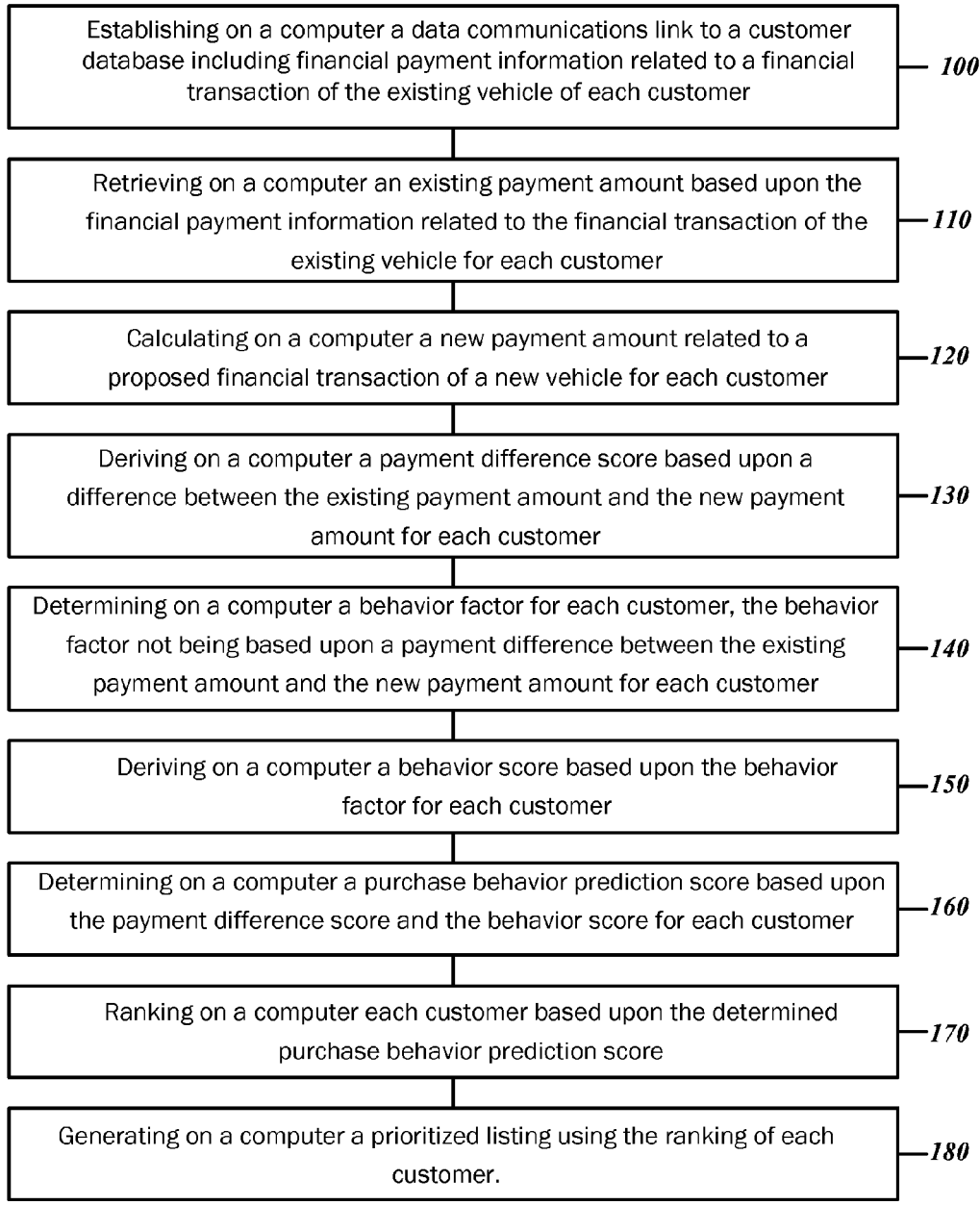
FIG. 2 is a flowchart illustrating an embodiment of a method of generating on a computer a prioritized listing of customers.

According to an aspect of the invention, there is provided a method of generating a prioritized listing of customers. Referring additionally now to FIG. 2, there is a flowchart illustrating an embodiment of the method of generating the listing of customers. Each customer has an existing vehicle. The method includes a step 100 of establishing on a computer, such as the server 26, a data communications link to a database. The database includes financial payment information related to a financial transaction of the existing vehicle of each customer. The method further includes a step 110 of retrieving on a computer an existing payment amount based upon the financial payment information related to the financial transaction of the existing vehicle for each customer. The method further includes a step 120 of calculating on a computer a new payment amount related to a proposed financial transaction of a new vehicle for each customer. The method further includes a step 130 of deriving on a computer a payment difference score based upon a difference between the existing payment amount and the new payment amount for each customer. The method further includes a step 140 of determining on a computer a behavior factor for each customer. The behavior factor is not based upon a payment difference between the existing payment amount and the new payment amount for each customer. The method further includes a step 150 of deriving on a computer a behavior score based upon the behavior factor for each customer. The method further includes a step 160 of determining on a computer a purchase behavior prediction score based upon the payment difference score and the behavior score for each customer. The method further includes a step 170 of ranking on a computer each customer based upon the determined purchase behavior prediction score. The method further includes a step 180 of generating on a computer a prioritized listing using the ranking of each customer.

It is contemplated that the foregoing method recognizes that a customer buying decision making process is much more complex than a mere comparison of existing payment amount and new payment amount. The method considers a behavior factor that is not based upon a payment difference between the existing and new payment amounts. In this regard, the method facilitates taking into consideration a factor that is beyond mere differences in payment amounts and allowing for a more robust or intelligent sales tool.

It is contemplated that other embodiments of the invention may include less than all of the steps 100-180. Moreover, it is contemplated that the various steps may be implemented in alternative sequence. It is understood that the foregoing method and other embodiments described herein may be implemented using various computer software, computer hardware, and firmware and various combinations of the same according to those methods which are well known to one of ordinary skill in the art. Such computer software, hardware and firmware may be in various components which may be localized or distributed remotely from each other.

As mentioned above, the various steps of the method described above may utilize "a computer." Such a computer may take the form of any of the exemplary client computer system 12, mobile device 20, and/or the server website 24 with the server 26. The method may be implemented through the use of a computer software program installed on the server 26. In common commercial terms, the method may be provided as a software as a service (SaaS) implementation. A service provider may operate the server website 24. Interaction with the software programming that may embody the foregoing described method of generating a prioritized listing of customers may be offered to sales organizations via access to the server website 24, such as via the Internet 16. In this regard, the client computer system 12 is a "client" of the remote accessed server website 24.

In the context of vehicle sales, such a service provider may offer SaaS access to vehicle dealerships or dealers. The client computer system 12 may be a computer, computer system or computer network of such a dealer. This arrangement would allow for sales personnel of a dealer to utilize the prioritized listing. In this regard, the user 14 may be a sales person of the dealer. The sales person may interact with a client computer system 12 and/or untethered data communication modalities such as the mobile device 20, this may be his or her smart phone or tablet device. In another configuration, the method may be implemented through the use of a computer software program installed entirely client-side on the client computer system 12. Further still, it is contemplated that various portions of the methods described herein may be implemented through various portions and combinations of computers which may be remote from each other.

In the context of a vehicle dealer, the local computer software system that includes the various data for each of its customers is generally referred to as a dealer management system ("DMS"). In an embodiment the client computer system 12 may be a DMS which includes a database of customer information. For ease of discussion, an embodiment in the context of a software implementation installed and executed by the server 26 will now be discussed below for purposes of expanding upon a method of the present invention. The DMS may be configured to incorporate portions of the server website user experience, such as through browser windows and the like such that the user 14 may access the server website 24 through initial access to the client computer system 12 in the form of the DMS. The DMS would likely include information about the dealership's customers, the customer vehicle(s), the financial transaction information the customer vehicle to the extent the dealer sold the customer the vehicle, and service data which may include vehicle mileage information. The financial transaction information may include the amount paid for the vehicle, payment amount, contract term or months of payment, amount paid at closing or "drive offs," warranty information, applicable incentives and the underlying qualifications for any incentives, applicable interest rates, miles included or allowed prior to additional fees being due (or over miles penalty information), residual vehicle value, and so forth.

Referring now to FIGS. 3-11, there are depicted a series of exemplary display screens that facilitate the user 14 to interact with the software implementing the method of generating the prioritized listing of customers. Such display screens may represent a software user interface. FIG. 3 is an exemplary display screen displaying a main customer listing dashboard 40. In this embodiment the main customer listing dashboard 40 is the display screen that allows the user 14 to see a customer listing of various customers as identified by data associated with each customer, such as customers 42a, 42b, 42c, 42n and so forth. Such customers may be those customers of a particular vehicle dealership, for example. Associated with each customer 42 may be information regarding the existing vehicle of the customer. For example, customer 42b is denoted as "Jane M." having an existing vehicle identified as "2012 E350W4." Such customers 42 may be considered potential buyers of a new vehicle for which a new transaction may be executed.

In this main customer listing dashboard 40, there are provided transaction type tabs, denoted as a lease tab 44, a finance tab 46, and a cash tab 48. Depending upon which transaction type tab is selected, differing information is displayed. In this view, the lease tab 44 is selected (as indicated by the bold type face). In this regard, the customers 42 are those associated with lease type of financial transactions. In this view, the customers 42 are prioritized based upon their behavior prediction score. Specific numeric values of the behavior prediction score for each customer 42 are listed under the heading tab "BPS". In this regard, the main customer listing dashboard 40 represents an example of a prioritized listing of customers 42 or at least a portion thereof as contemplated in step 180 as mentioned above. It is contemplated that where a customer 42 has multiple vehicles such customer may appear multiple times in a prioritized listing or only once depending upon how the computer system is desired to be arranged.

This embodiment includes other heading tabs 50, 52, 54, 56, 58, 60, 62, 64, and 66 (as respectively denoted "PAYMENT", "EQUITY", "INCENTIVES", "PRODUCT", "MILES", "WARRANTY", "OWNERSHIP" AND "REMAINING"). Selection of a given customer 42 and the heading tab corresponding to a behavior factor of interest results in the display of additional display screens, respectively, display screens 68, 70, 72, 74, 76, 78, and 80 as respectively illustrated in FIGS. 4-10 as discussed further below.

As mentioned above, the method includes the step 100 of establishing on a computer a data communications link to a database. The data communications link may be of various forms. This may be in the form of a persistent flow of data or intermittent or packetized transmission of data. The database may be the storage 28. The storage 28 may be the localized database collocated with the server 26. In this regard the data communications link would be internal to the server website 24. However, the database and/or portions thereof may be located remote from the server 26. For example, the database may include portions that are disposed as part of the client computer system 12. In such a case, it is contemplated that the client computer system 12 may access the Internet 16 via a communications link 18, and the server website 24 may thus access a database contained client-side via a communications link 30 to the Internet 16 and the communications link 18 to the client computer system 12.

The database may be any of the example databases D1, D2, D3 and D4 which may be accessed via respective communications links 32, 34, 36 and 38 and the Internet 16. One of ordinary skill in the art will appreciate that such example databases D1, D2, D3, and D4 may represent any number of databases containing any type of data. In this regard, it is understood that the term database generally refers to computer storage containing data that may be accessed via a computer and that such computer storage may be at a singular location or a remote location and may have multiple component parts. Moreover, it is understood that the databases may be populated by any means, whether through an automated process or via manual user entry. This is with respect to step 100 and any other steps or functions as contemplated here.

The database includes financial payment information related to a financial transaction of the existing vehicle of each customer. The database may be the storage 28. Financial payment information may include monthly (or periodic) payment amount and number of payments or payment term information. Such financial payment information may include data as already stored in the database or require the system to seek the information or an update thereof from various other databases and sources. In this regard the server 26 may be configured to automatically remotely access databases to retrieve and locally store the financial payment information. For example, the financial payment information may be data from the local DMS (as in the case where the system has access to the DMS because the client computer system 12 is associated with the very same dealer that the customer previously bought the existing vehicle from). Other sources of such data may be from a banking institution, a credit bureau, the customer, or as manually input into the database by the user 14.

The method further includes the step 110 of retrieving on a computer an existing payment amount based upon the financial payment information related to the financial transaction of the existing vehicle for each customer 42. In this embodiment, this may just entail the server 26 accessing the payment amount from the storage 28. The database may be the storage 28. The storage 28 may be the localized database collocated with the server 26.

The method further includes the step 120 of calculating on a computer a new payment amount related to a proposed financial transaction of a new vehicle for each customer. In this regard, it is contemplated that the system may first determine a prospective new vehicle for each customer. This may be accomplished by assuming the new vehicle would be comparable to the existing vehicle. The system may include a data look up table that includes replacement or comparable vehicles corresponding to existing vehicle types. In addition a new vehicle may be determined according to data as input by the user 14. Regardless of how the new vehicle is determined, a proposed financial transaction may next be determined. A proposed financial transaction and the associated new payment amount may be determined according to any of those methods that are known to one of ordinary skill in the art. Various contemporary software products in the prior art provide examples of computerized methodologies of providing deal terms of a proposed financial transaction.

The method further includes the step 130 of deriving on a computer a payment difference score based upon a difference between the existing payment amount and the new payment amount for each customer. Having determined the existing payment amount and a new payment amount a difference between the amounts may be determined. In this regard a difference may be an actual amount based upon a simple subtractive mathematical operation or more broadly a relative comparison of amounts. Further, such difference may be accounted for as a percentage change or variation thereof.

In any event such difference need not be stored as a discreet numeric value but may be accounted for during the derivation of the payment difference score. The payment difference score may be derived according to any algorithm provided such algorithm takes into account the existing payment amount and the new payment amount. As such, as used herein the payment difference score refers to any value that is based upon the existing payment amount and the new payment amount. The payment difference score may be a numeric value such as on a scale of 0 to 100, for example. A high payment difference score may be associated with the customer 42 having a high probability of accepting the terms of the proposed financial transaction. For example where the monthly payment of a customer 42 would be dramatically lowered, this would correspond to a high payment difference score.

Figure 4:
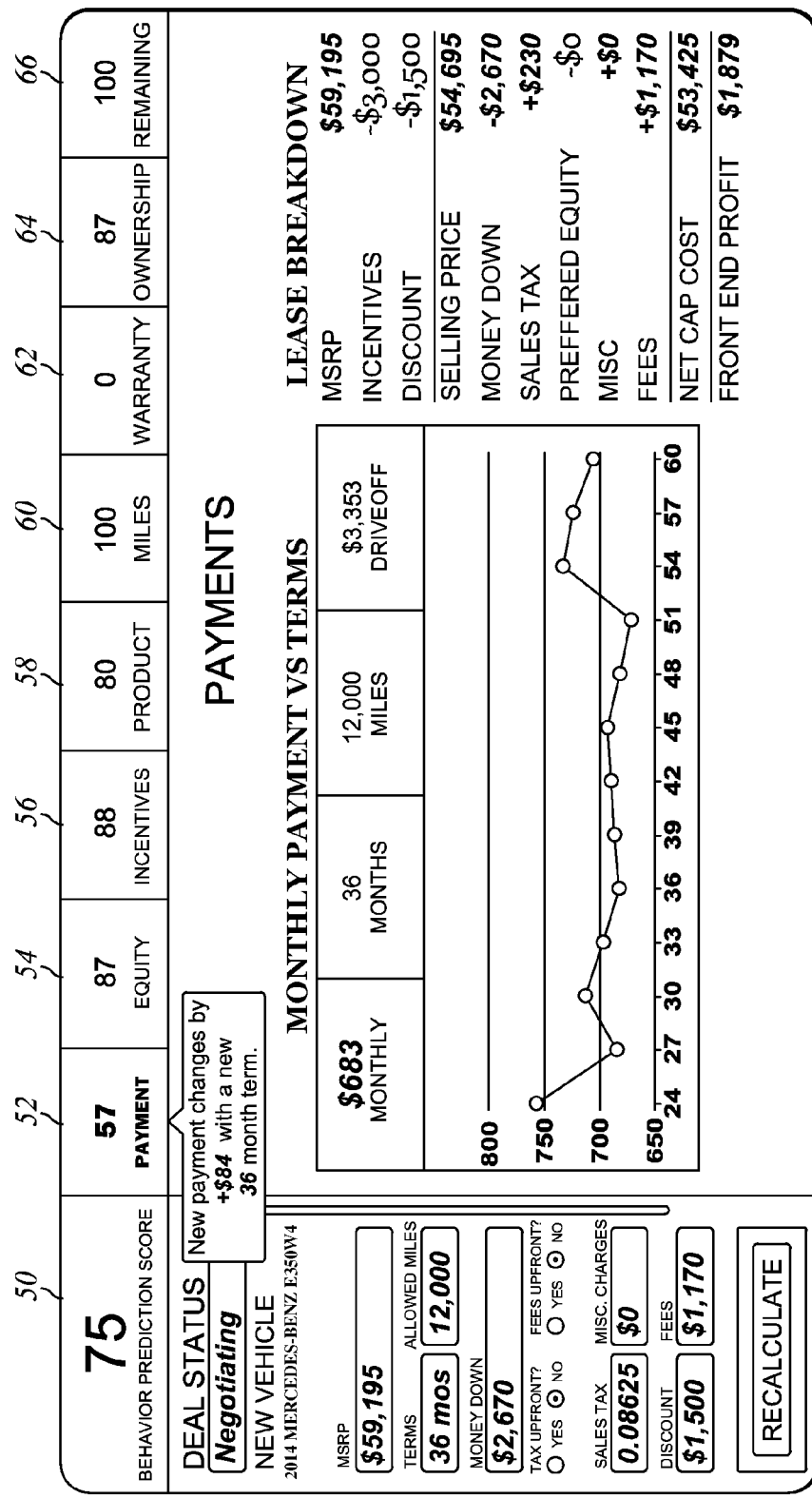
FIG. 4 is an exemplary display screen of a payment factor associated with payment factor information for a sample customer.

FIG. 4 is the exemplary display screen 68 of a behavior factor associated with payment factor information for a sample customer 42. For this sample customer 42, at the heading tab 52 the payment difference score is indicated as "57" (based upon a 100 point scale). In this display screen 68, major deal terms may be displayed such as vehicle price (such as MSRP), term, allowed miles, amount down, taxes, discounts, fees, equity, and profit information. Further, variations of deal terms are displayed in this example associated with various different terms, as ranging from 24 months to 60 months. Payment comparative information is shown for as indicating an actual amount payment difference as well as a percentage payment difference. In this example, the new payment amount would be expected to increase by 14%. This would account for a relatively moderate payment difference score.

As mentioned above, the method further includes the step 140 of determining on a computer a behavior factor for each customer. The behavior factor is not based upon a payment difference between the existing payment amount and the new payment amount for each customer. The behavior factor may be any of a myriad of factors that may be contemplated to influence or affect a customer's buying decision. As some examples, such behavior factors may include equity value, incentive related value, product related value, lease mileage value, warranty related value, time of ownership value, payments remaining value, interest rate related value, household demand value, individual buying motives, social media analytics, socio-economic and demographic data, and Internet activity. These examples of behavior factors are discussed further below. It is contemplated that the method may include consideration of any number of behavior factors and combinations thereof when computing the behavior prediction score. As used herein the term behavior factor refers to a variable that is used in the derivation of a behavior score for a given customer 52 that is not based upon a payment difference between the existing payment amount and the new payment amount. However, it is contemplated that certain behavior factors may be related to either the existing financial transaction of an existing vehicle or the new financial transaction of a new vehicle. For example as discussed in further detail below, the equity value is only related to the existing vehicle. Whereas the incentive related value is only related to the new vehicle. Moreover, the behavior factors may be related to the calculation of the existing payment amount or the new payment amount. For example, the equity value would be only related to the new payment amount.

The method further includes the step 150 of deriving on a computer a behavior score based upon the behavior factor for each customer. The behavior score may be a numeric value such as on a scale of 0 to 100, for example. A high behavior score may be associated with the customer 42 having a high probability of accepting the terms of the proposed financial transaction.

The behavior factor may be an equity value. The equity value may be related to a summation of payments made with regard to the financial transaction of the existing vehicle for each customer 42. The equity value may be related to a financial obligation pay-off amount with regard to the financial transaction of the existing vehicle for each customer. The equity value may further be derived based upon certain "pull forward" programs where the entity leasing the vehicle may offer a forbearance of certain amounts or number of payments if the customer 42 were to purchase another vehicle. Other pull forward programs may be offered from the vehicle manufacturer, financial institution or others. Where the customer 42 is financially obligated under the existing vehicle to pay a certain number of payments remaining under the lease agreement, the greater the amount would be anticipated to be a negative influence as to the customer's willingness or motivation to "break" the existing lease agreement so as to enter into a new financial transaction for a new vehicle. The equity value may further be related to a determined market value of the existing vehicle for each customer 42. In the context of a lease, the financial terms of the lease may provide for a buy-out provision to allow the customer 42 to outright purchase the vehicle. In this regard, the equity value may further include information regarding an estimated value of the vehicle.

Figure 5:
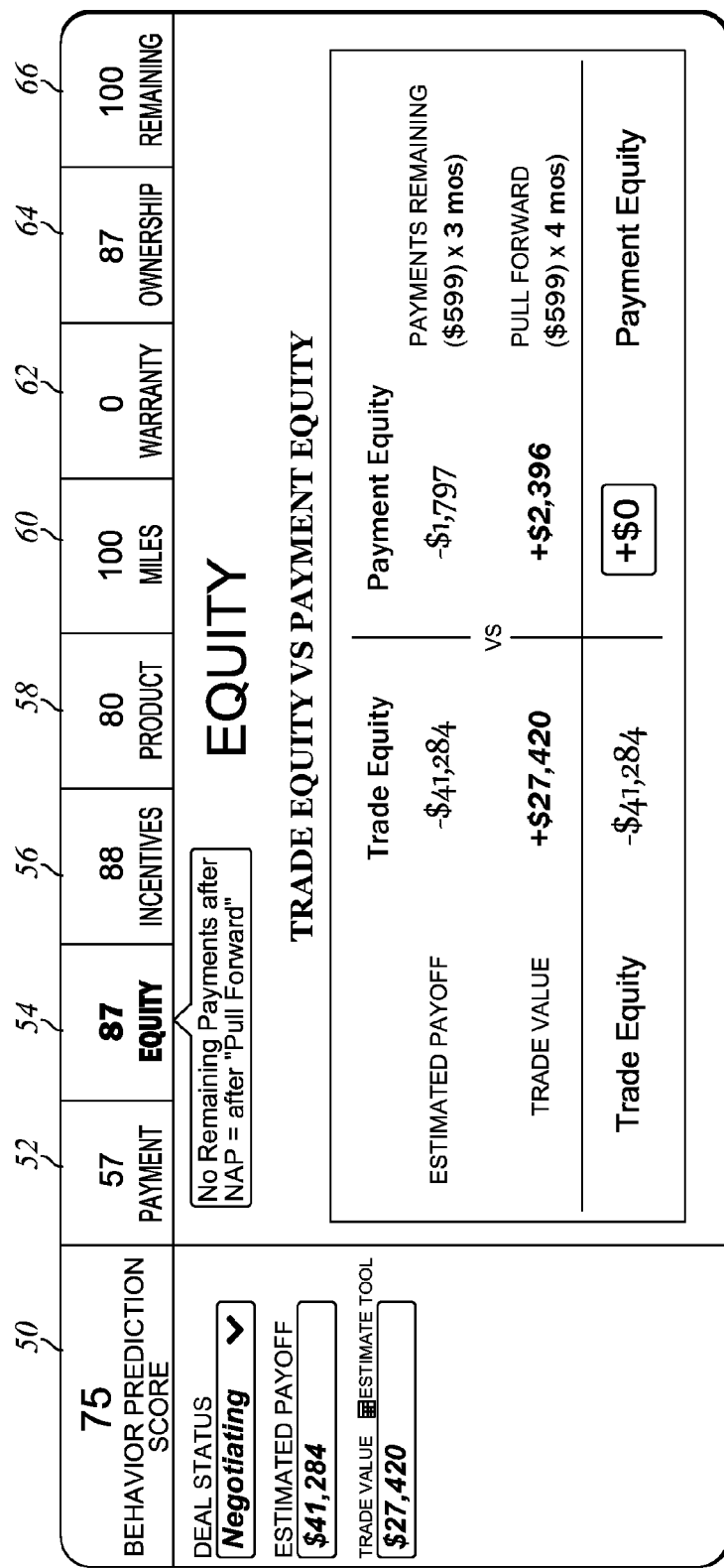
FIG. 5 is an exemplary display screen of a behavior factor associated with equity factor information for the sample customer.

FIG. 5 is the exemplary display screen 70 of a behavior factor associated with equity factor information for the sample customer 42. For this sample customer 42, at the heading tab 54 an equity score is indicated as "87" (based upon a 100 point scale). In this display screen 70, equity factor information is displayed for the existing vehicle of the customer, such as the estimated payoff amount and trade value of the existing vehicle. In this example, with regard to payment equity, the terms of the financial transaction of the existing vehicle indicate that there are three payments remaining (which accounts for negative equity). However, there is indicated a "pull forward" amount that is available to the customer 42 which results in a new zero payment equity. The trade equity indicates a negative equity. This would account for a relatively high equity score.

The behavior factor may be an incentive related value. The incentive related value may be related to the total amount of current available financial incentives related to a proposed financial transaction of a new vehicle for each customer 42. Various financial incentives may be available to the customer 42. It is contemplated that some incentives may require the customer 42 to qualify for such incentives. The customer 42 may be required to be a member of a certain group or category. For example, incentives may be offered for certain employees of a given employer and offered as an employee benefit. The incentive related value is related to a customer employment data. In this regard, the method of the present invention may include receiving on a computer customer employment data associated with at least one customer 42. The customer employment data is related to the employer of the customer 42. Such data may be obtained by the server 26 through various methods. For example, social media analytics may be applied to search for and obtain data from a social media account for customer that may have information as to the employer of the customer 42. Other sources of information may depend upon what qualifications are required for a given incentive. For example, where incentives are offered to veterans, this would allow for the possibility of utilizing other remote databases for finding out such information.

FIG. 6 is the exemplary display screen 72 of a behavior factor associated with incentives factor information for the sample customer 42. For this sample customer 42, at the heading tab 56 an incentive score is indicated as "88" (based upon a 100 point scale). In this display screen 72, incentives information is displayed for the new vehicle of the sample customer 42. A substantial incentives amount is indicated. This accounts for the relatively high incentive score. Even though the incentives amount would presumably be used in the determination of the payment amount of the new vehicle, separating out the incentive related value as a behavior factor distinct from the payment factor may result in a higher degree of sophistication when attempting to predict the buying decision of the customer 42. In this regard, an assumption may be contemplated that a substantial amount of incentives would tend to encourage a customer 42 to make a buying decision as the customer 42 would tend to believe that the customer 42 is getting more value out of the deal.

The behavior factor may be a product related value. The product value may be related to specific product enhancements of the new vehicle compared to the existing vehicle for each customer 42. For example, the new vehicle may have a new body style, certain features that are "standard" or not, or differences in fuel economy as compared to the existing vehicle. It is contemplated that such product differences may impact the purchase behavior of the customer.

FIG. 7 is the exemplary display screen 74 of a behavior factor associated with product factor information for the sample customer 42. For this sample customer 42, at the heading tab 58 a product score is indicated as "80" (based upon a 100 point scale). In this respect a comparison of the existing vehicle data and the new vehicle data is presented. It is contemplated that the new vehicle may be considered desirable in terms of product comparison and thus a relatively high product score is indicated.

The behavior factor may be a lease mileage value. The lease mileage value may be related to a status of the number of miles driven of the existing vehicle for each customer 42 with regard to total allowable lease mileage. Typically, lease terms for the current vehicle would provide that the customer 42 pay additional amounts (such as on a per mile basis) where the vehicle has miles drive over a pre-agreed upon amount. In this regard, where the existing vehicle is "over miles" this situation would tend to influence the customer 42 to make a purchase decision.

FIG. 8 is the exemplary display screen 76 of a behavior factor associated with miles factor information for the sample customer 42. For this sample customer 42, at the heading tab 60 a miles score is indicated as "100" (based upon a 100 point scale). In this respect mileage information and additional payment amounts are estimated. As this sample customer 42 is "over miles", it is presumed that the customer 42 does not want to incur further mileage fees or penalties, and thus a high miles score is presented.

The behavior factor may be a warranty related value. The warranty related value may be related to a warranty status with regard to the financial transaction of the existing vehicle for each customer 42. Often times certain manufacturer's warranty, extended warranty or other vehicle warranty may cease during the term of a lease agreement. In this regard, it may be presumed that it is desirable by the customer to have the warranty active. Thus where a warranty becomes inactive, this would tend to be a behavior factor that would influence the customer 42 to make a buying decision.

Figure 9:
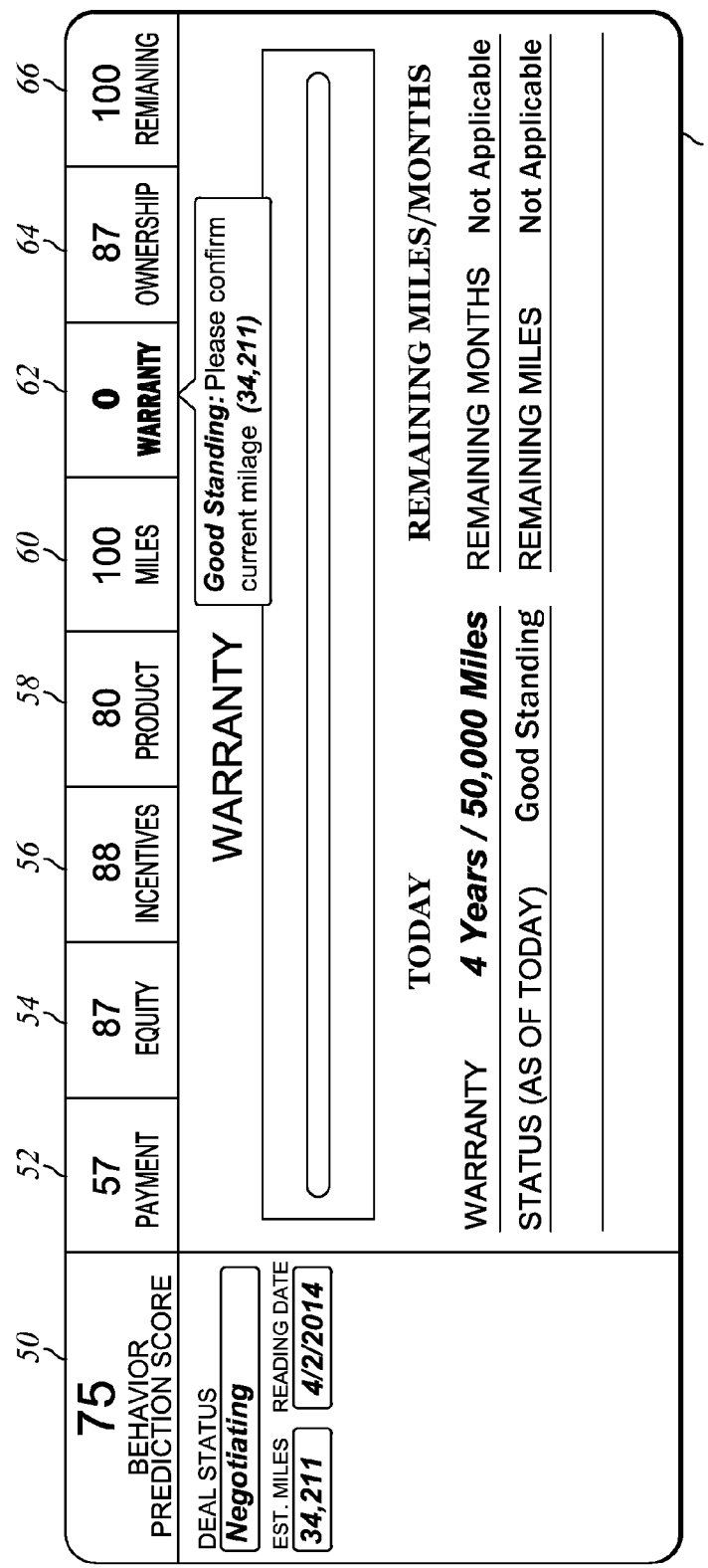
FIG. 9 is an exemplary display screen of a behavior factor associated with warranty factor information for the sample customer.
Figure 10:
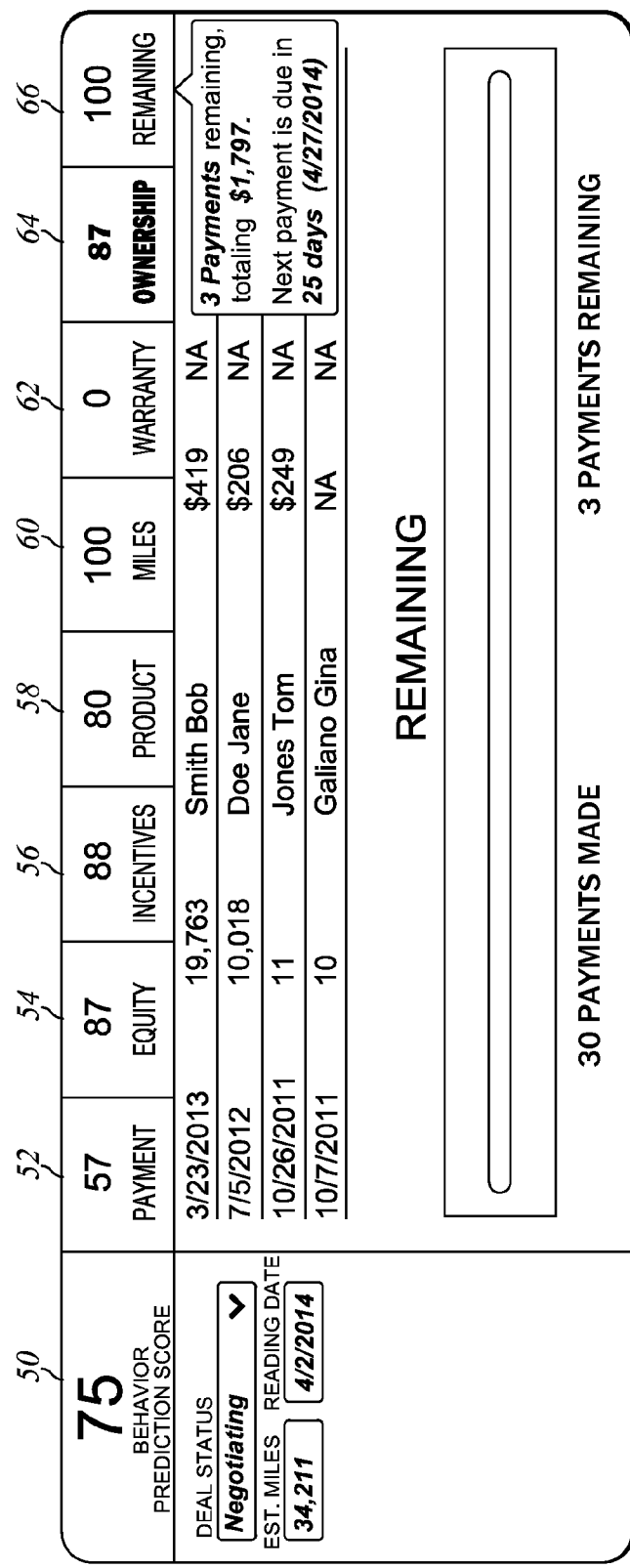
FIG. 10 is an exemplary display screen of a behavior factor associated with ownership factor information for the sample customer.

FIG. 9 is the exemplary display screen 78 of a behavior factor associated with warranty factor information for the sample customer 42. For this sample customer 42, at the heading tab 62 a miles score is indicated as "0" (based upon a 100 point scale). In this respect the warranty for the existing customer 42 is active and this factor would not be an influencer towards making a purchase decision.

The behavior factor may be an amount of time of ownership related value. The amount of time of ownership value may be related to the amount of time owning the existing vehicle for each customer 42. For example, referring to FIG. 10 there is depicted the exemplary display screen 80 of a behavior factor associated with ownership factor information for the sample customer 42. For this sample customer 42, at the heading tab 64 an ownership value is indicated as "87" (based upon a 100 point scale). In this regard the customer 42 has owned the existing vehicle a substantial amount of time with only 3 months remaining on the lease. This factor may tend to indicate a motivation to make a purchase the longer the customer 42 has owned the existing vehicle.

The behavior factor may be a payments remaining value. The payments remaining value may be related to a summation of a number of payments remaining with regard to the financial transaction of the existing vehicle for each customer 42. For this sample customer 42, at the heading tab 66 a payments remaining value is indicated as "100" (based upon a 100 point scale). In this regard the customer 42 only has three months remaining on the lease and would be presumed to be in need to make a purchase decision prior to the lease expiring. This factor may tend to indicate a motivation to make a purchase based upon the fewer the number of payments remaining.

The behavior factor may be an interest rate related value. The interest rate value may be related to an interest rate related to a proposed financial transaction of a new vehicle for each customer 42. This would presumably be in the context of a lease or financing arrangement. Where a customer 42 is able to change from one transaction to another with a substantial lowering of the interest rate, this would tend to cause the customer 42 to believe that the customer 42 is getting more value out of the deal.

The behavior factor may be a household demand value. The household demand value may be related to a number of vehicles associated with each customer 42. In this regard, information about vehicles in relation to a customer 42 may provide insights into the purchase decision making process. The household demand value is based upon vehicle registration data. The method of the present invention may further include receiving on a computer vehicle registration data associated with at least one customer 42. Such information may be retrieved by remotely accessing a department of motor vehicles (DMV) database for example.

The behavior factor may be individual buying motives of the customer 42. For example, the individual buying motives may be those characterized as economy, innovation, prestige and average. These may be relatively subjective characterizations but may be correlated to the calculation of the purchase behavior prediction score. The particular individual buying motives may affect the relative weightings or coefficients assigned to the various payment difference score and/or behavior prediction scores that are used to calculate the purchase behavior prediction score. For example, where the individual buying motives of a customer 42 are designated as an economy buyer, a relative great emphasis may be placed upon the payment difference score, and the behavior factors of warranty and mileage as these factors are highly financial in nature and presumed to be of great relative importance to such customer 42. Where the individual buying motives of a customer 42 are designated as an innovation buyer, a relatively great 34 emphasis may be placed upon the behavior factor of the product. Where the individual buying motives of a customer 42 are designated as a prestige buyer, a relatively lesser emphasis may be placed upon the payment difference score and other financial related behavior factors with a higher emphasis or weighting with respect to product and ownership.

The behavior factor may be socio-economic and demographic data. Such data may take the form of household salary information and other financial information that may be indicative of the customer 42 having the capacity to purchase, not just the desire.

The behavior factor may be related to Internet activity of the customer 42. Such activity may be related to online geo-environmental data, online data entry criteria, online visitor activity, and behavior of each user session. For example, the dealership may have a website that the customer 42 has interacted with or used to request information. To the extent that it is determined that the customer 42 has spent a good deal of time and activity associated with online information for a particular new vehicle, this would be indicative of the customer's willingness to enter into a transaction for a new vehicle as an example.

Figure 11:
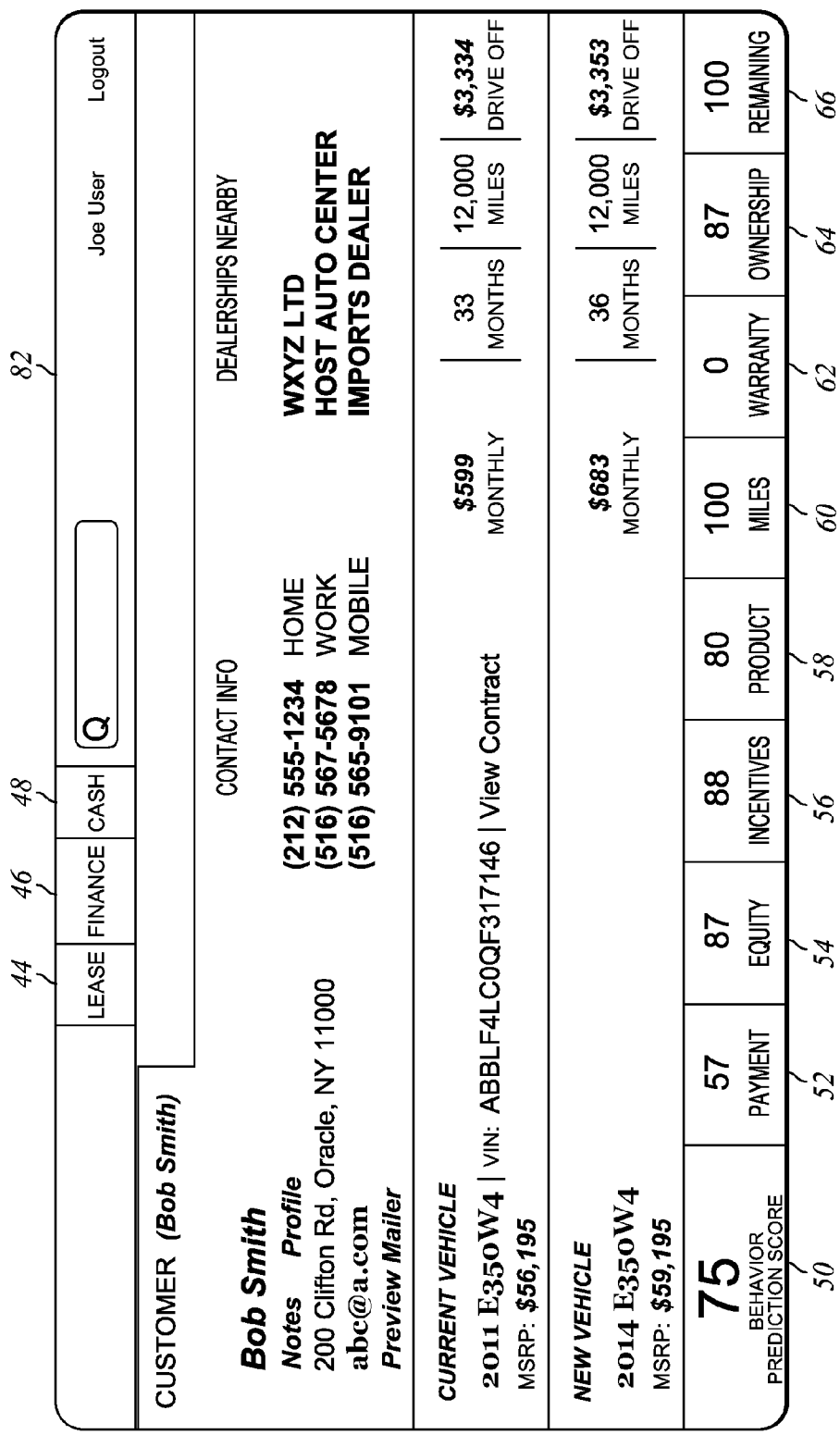
FIG. 11 is an exemplary display screen associated with deal sheet information for the sample customer.

FIG. 11 is the exemplary display screen 82 for the sample customer 42 associated with deal sheet information. As would be expected there is provided information regarding the proposed new vehicle and the financial parameter regarding the proposed transaction. Advantageously, the payment difference score and the various behavior scores are displayed for the user 14.

As mentioned above, the method further includes a step 160 of determining on a computer a purchase behavior prediction score based upon the payment difference score and the behavior score for each customer 42. It is contemplated that the relative weighting of the payment difference score and the behavior score need not be equal when each is used in an algorithm to calculate a purchase behavior prediction score. In reference to the sample customer 42 corresponding to the screen displays of FIGS. 4-11, the purchase behavior prediction score of "75" is indicated in heading tab 50. In this example, it is contemplated that the system has utilized the payment difference score as well as behavior scores associated with a number of behavior factors, including equity, incentives, product, miles warranty, ownership and remaining payments. It is contemplated that the relative weighting of the payment difference score and the behavior scores may be adjusted by the user 14 of the system. As one of ordinary skill in art will appreciate, various algorithms and computations may be made using various coefficients or relative weighting of the scores. Moreover, it is contemplated that such algorithms may be adjusted over time as additional data becomes available as to how the various purchase decisions were ultimately made by the customer 42 to make purchases.

As mentioned above, the method further includes a step 170 of ranking on a computer each customer 42 based upon the determined behavior purchase score. Such ranking may be in ascending or descending order. Where the purchase behavior prediction scores are of equal value, it is contemplated that the customers 42 may be further ranked according to some other methodology, such as based upon lease end date. This ranking may be done in connection with an internal computer request to display the main customer listing dashboard 40. In this regard, the method further includes a step 180 of generating on a computer a prioritized listing using the ranking of each customer 42. The main customer listing dashboard 40 of FIG. 3 is an example of a display of a prioritized listing. The prioritized listing may be purely in electronic form as stored in computer memory and need not be displayed to exist.

Further the prioritized listing may be electronically transmitted from the server to make the calculations, such as server 26. This may be via the electronic links 30 and 18 for display at the client computer system 12 or via electronic links 30 and 22 at the mobile device 20. Where the calculations are being effectuated locally, such as in a client-side installation, the transmission would merely be an "internal" one emanating from a central computing unit (CPU) to an output device such as a monitor.

As used herein the term "establishing" refers to at least identifying an electronic destination and sending and/or receiving electronic data to or from such electronic destination. As used herein the term "retrieving" refers to obtaining through the use of a computer or electronic component thereof, and may include internal activities within a given computer or require remote access between two computers at separate locations. As used herein the term "calculating" refers to determining or computing using mathematical operations or a sequence of operations using a computer. As used herein the term "deriving" refers to obtaining based upon a difference. As used herein the term "determining" refers to calculating or concluding using mathematical operations or a sequence of operations using a computer. As used herein the term "ranking" refers to arranging or assigning a relative position based upon a value or a characteristic. As used herein the term "generating" refers to utilizing computerized operations to accomplish a task with an output or goal.

As mentioned above, at least portions of the method of the present invention according to various embodiments utilize a computer or computers. It is contemplated that the complexities and magnitude of algorithms are made feasible via such usage of computer when deriving the payment difference score and the behavior scores, and then determining the purchase behavior prediction score for each customer 42. This is especially the case where many behavior scores are utilized. Moreover, the underlying data for such score may be used from a variety of databases, which naturally lends itself to the rapid nature of electronic data passage.

In the above discussed example using the display screens illustrated in FIGS. 3-11, information is presented associated with a lease type of financial transaction. However, it is contemplated that there are other financial transaction types, such vehicle financing or outright cash payment for the vehicle. In this regard, not all of the above behavior factors as discussed above would be applicable. For example, the months remaining factor would not be a consideration. Moreover, the meaning of the existing payment amount would be different. For example the existing payment amount would be zero (in the case where a cash buyer has outright purchased or finance customer has paid off the customer's loan). The new payment amount would be related to the vehicle purchase price in the case of an all cash buyer and periodic payment amount in the case of a finance customer 42.

According to another aspect of the present invention, there is provided an article of manufacture comprising a non-transitory program storage medium readable by a data processing apparatus. The medium tangibly embodies one or more programs of instructions executable by the data processing apparatus to perform a method of generating on a computer a prioritized listing of customers 42. The method may be any of those methods as discussed above. Such article of manufacture may be any combination of computer software, hardware and firmware as discussed above.

The particulars shown herein are by way of example and for purposes of illustrative discussion of the embodiments of the present invention only and are presented in the cause of providing what is believed to be the most useful and readily understood description of the principles and conceptual aspects. In this regard, no attempt is made to show more details than is necessary for a fundamental understanding of the disclosure, the description taken with the drawings making apparent to those skilled in the art how the several forms of the presently disclosed invention may be embodied in practice.

What is claimed is:

1. A method of generating on a computer a prioritized listing of customers, each customer having an existing vehicle, the method comprising:
    establishing on a computer a data communications link to a database, the database including financial payment information related to a financial transaction of the existing vehicle of said customer;
    retrieving on a computer an existing payment amount based upon the financial payment information related to the financial transaction of the existing vehicle for said customer;
    calculating on the computer a new payment amount related to a proposed financial transaction of a new vehicle for said customer;
    deriving on the computer a payment difference score used upon a difference between the existing payment amount and the new payment amount for said customer;
    determining on the computer a behavior factor for each customer, the behavior factor being an equity value for said customer;
    deriving on the computer a behavior score based upon the behavior factor for said customer;
    determining on the computer a purchase behavior prediction score based upon the payment difference score and the behavior score for said customer;
    ranking on the computer said customer based upon the determined purchase behavior prediction score; and
    generating on the computer a prioritized listing using the ranking of said customer.

2. The method of claim 1 further includes:
    making the prioritized listing available via the computer.

3. The method of claim 1 wherein the equity value is related to a summation of payments made with regard to the financial transaction of the existing vehicle for said customer.

4. The method of claim 1 wherein the equity value is related to a financial obligation pay-off amount with regard to the financial transaction of the existing vehicle for said customer.

5. The method of claim 4 wherein the equity value is further related to a determined market value of the existing vehicle for said customer.

6. The method of claim 1 wherein the behavior factor further includes a payments remaining value, the payments remaining value is related: to a summation of a number of payments remaining with regard to the financial transaction of the existing vehicle for said customer.

7. The method of claim 1 wherein the behavior factor further includes a warranty related value, the warranty value is related to a warranty status with regard to the financial transaction of the existing vehicle for said customer.

8. The method of claim 1 wherein the behavior factor further includes a lease mileage value, the lease mileage value is related to a status of a number of miles driven of the existing vehicle for said customer with regard to total allowable lease mileage.

9. The method of claim 1 wherein the behavior factor further includes a product related value, the product related value is related to specific product enhancements of the new vehicle compared to the existing vehicle for said customer.

10. The method of claim 1 wherein the behavior factor further includes an amount of time of ownership related value, the amount of time of ownership related value is related to the amount of time owning the existing vehicle fir said customer.

11. The method of claim 1 wherein the behavior factor further include an incentive related value, the incentive related value is related to the total amount of current available financial incentives related to a proposed financial transaction of a new vehicle for said customer.

12. The method of claim 11 wherein the incentive related value is related to a customer employment data.

13. The method of claim 12 further includes:
    receiving on the computer customer employment data associated with at least one customer.

14. The method of claim 13 wherein the customer employment data is related to the employer of the customer.

15. The method of claim 1 wherein the behavior factor further includes an interest rate related value, the interest rate related value is related to an interest rate related to a proposed financial transaction of a new vehicle for said customer.

16. The method of claim 1 wherein the behavior factor further includes a household demand value, the household demand value is related to a number of vehicles associated with said customer.

17. The method of claim 15 wherein the household demand value is based upon vehicle registration data.

18. The method of claim 16 further includes:
    receiving on the computer vehicle registration data associated with at least one customer.

19. The method of claim 1 wherein the determining on the computer a behavior factor for said customer includes establishing on a computer a data communications link to a database, the database containing information, regarding the behavior factor.

20. The method of claim 1 wherein the behavior factor includes more than one behavior factor, the method includes deriving on the computer a behavior score based upon each behavior factor for said customer.

21. The method of claim 20 wherein the purchase behavior prediction score is based upon the payment difference score and the behavior scores for said customer.

22. The method of claim 1 further includes
    determining on the computer a buying behavior factor for each customer; and
    determining the purchase behavior prediction score using the buying behavior factor to adjust a relative weighting, among the payment difference score and the behavior scores for said customer.

23. An article of manufacture comprising a non-transitory program storage medium readable by a data processing apparatus, the medium tangibly embodying one or more programs of instructions executable by the data processing apparatus to perform a method of generating on a computer a prioritized listing of customers, each customer having an existing vehicle, the method of generating comprising:
    establishing on a computer a data communications link, to a database, the database including financial payment information related to a financial transaction of the existing vehicle of said customer;
    retrieving on a computer an existing payment amount based upon the financial payment information related to the financial transaction of the existing vehicle for said customer;
    calculating on the computer a new payment amount related to a proposed financial transaction of anew vehicle for said customer;
    deriving on the computer a payment difference score based upon a difference between the existing payment amount and the new payment amount for said customer;
    determining on the computer a behavior factor for saide customer, the behavior factor being an equity value for said customer;
    deriving on the computer a behavior score based upon the behavior factor for said customer;
    determining on the computer a purchase behavior prediction score based upon the payment difference score and the behavior score for said customer;
    ranking on the computer each customer based upon the determined purchase behavior prediction score; and
    generating on the computer a prioritized listing using the ranking of saideadi customer.

\* \* \* \* \*